US009386440B2

(12) United States Patent
Cho et al.

(10) Patent No.: US 9,386,440 B2
(45) Date of Patent: Jul. 5, 2016

(54) METHOD FOR IMPROVING COMMUNICATION PERFORMANCE USING VEHICLE PROVIDED WITH ANTENNAS

(75) Inventors: Hangyu Cho, Anyang-si (KR); Kyujin Park, Anyang-si (KR); Minseok Oh, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 14/114,511

(22) PCT Filed: Apr. 30, 2012

(86) PCT No.: PCT/KR2012/003363
§ 371 (c)(1),
(2), (4) Date: Nov. 5, 2013

(87) PCT Pub. No.: WO2012/148243
PCT Pub. Date: Nov. 1, 2012

(65) Prior Publication Data
US 2014/0050193 A1   Feb. 20, 2014

Related U.S. Application Data

(60) Provisional application No. 61/480,354, filed on Apr. 28, 2011.

(51) Int. Cl.
*H04W 8/18* (2009.01)
*B60W 50/08* (2012.01)
*H04B 1/3822* (2015.01)
*H04B 7/04* (2006.01)
*H04L 29/08* (2006.01)

(52) U.S. Cl.
CPC .............. *H04W 8/18* (2013.01); *B60W 50/085* (2013.01); *H04B 1/3822* (2013.01); *H04B 7/0413* (2013.01); *H04L 67/025* (2013.01); *B60K 2350/35* (2013.01); *B60W 2540/28* (2013.01)

(58) Field of Classification Search
CPC .................................................... H04W 72/04
USPC ......................................................... 370/279
See application file for complete search history.

(56) References Cited

U.S. PATENT DOCUMENTS

| 7,746,825 B2* | 6/2010 | Olvera-Hernandez et al. ........... 370/331 |
| 2005/0195821 A1* | 9/2005 | Yun et al. ....................... 370/392 |
| 2006/0056316 A1* | 3/2006 | Chandra et al. ................ 370/254 |
| 2010/0046427 A1* | 2/2010 | Li et al. ......................... 370/328 |
| 2012/0063369 A1* | 3/2012 | Lin et al. ........................ 370/279 |

FOREIGN PATENT DOCUMENTS

| JP | 2006-041983 | 2/2006 |
| KR | 10-2009-0083365 | 8/2009 |
| KR | 10-2010-0064304 | 6/2010 |

OTHER PUBLICATIONS

Kaul, et al., "Effect of Antenna Placement and Diversity on Vehicular Network Communications," 4th Annual IEEE Communications Society Conference on Sensor, Mesh and Ad Hoc Communications and Networks, pp. 112-121, Jun. 2007.
PCT International Application No. PCT/KR2012/003363, Written Opinion of the International Searching Authority dated Nov. 29, 2012, 14 pages.

* cited by examiner

*Primary Examiner* — Ian N Moore
*Assistant Examiner* — Mewale Ambaye
(74) *Attorney, Agent, or Firm* — Lee, Hong, Degerman, Kang & Walmey; Jonathan Kang; Michael Monaco

(57) ABSTRACT

The present invention relates to a mobile communication system, and more specifically, to a method for providing an improved communication environment for a terminal using a vehicle provided with antennas, and to an apparatus for executing same. As related to one embodiment of the present invention, a data transceiving method for a terminal using a vehicle-mounted type communication module comprising a plurality of antennas comprises the steps of: establishing a wire data path with the communication module; negotiating multiple-antenna capabilities with a base station using multiple-antenna capabilities information of the communication module; and transmitting to the communication module multiple-antenna transmission parameters on the basis of the negotiation, and a data unit comprising uplink data to be transmitted to the base station, wherein the data unit, which has been generated in the medium access control (MAC) layer of the terminal and then converted into a radio frequency (RF) signal in the physical layer (PHY) of the communication module, can be transmitted to the base station using the plurality of antennas.

8 Claims, 5 Drawing Sheets

METHOD FOR IMPROVING COMMUNICATION PERFORMANCE USING VEHICLE PROVIDED WITH ANTENNAS

CROSS-REFERENCE TO RELATED APPLICATIONS

This application is the National Stage filing under 35 U.S.C. 371 of International Application No. PCT/KR2012/003363, filed on Apr. 30, 2012, which claims the benefit of U.S. Provisional Application Ser. No. 61/480,354, filed on Apr. 28, 2011, the contents of which are hereby incorporated by reference herein in their entirety.

TECHNICAL FIELD

The present invention relates to a mobile communication system, and more particularly, to a method for providing an improved communication environment for a terminal using a vehicle provided with antennas and an apparatus to implement the same.

BACKGROUND ART

Multiple Input Multiple Output (MIMO) is a term referring to multi-antenna technology employing a plurality of transmit antennas and a plurality of receive antennas. Using this technology, data transmission/reception efficiency may be improved. That is, multiple antennas may be used at the transmitter or the receiver of a wireless communication system to increase communication capacity and improve performance. In this document, MIMO can be referred to as "multiple antenna."

Multiple antenna technology does not rely upon a single antenna path to receive an entire message. Instead, in multiple antenna technology, the message is recovered by constructively combining data fragments received by multiple antennas. With the multiple antenna technology, data rate may be improved within cell coverage of a specific size, or the system coverage may be increased with particular data rate ensured. In addition, this technology may be used in a wide range of applications including a mobile communications terminal and a repeater. With multiple antenna technology, limitations in data traffic of the conventional technology employing a single antenna for mobile communication may be overcome.

FIG. 1 is a view illustrating the configuration of a typical multiple antenna (MIMO) communication system. In this system, $N_T$ transmit antennas are installed at the transmitter and $N_R$ receive antennas are installed at the receiver. When plural antennas are used at both the transmitter and receiver, as in this case, the channel transmission capacity is theoretically increased, compared to the case in which only one of the transmitter and the receiver has a plurality of antennas. Increase in channel transmission capacity is proportional to the number of antennas. Accordingly, transfer rate is increased and frequency efficiency is improved. When the maximum transfer rate upon use of one antenna is $R_o$, the transfer rate upon use of multiple antennas may be theoretically increased by a product of $R_o$ and the rate increase ratio $R_i$.

For example, in an MIMO communication system employing four transmit antennas and four receive antennas, it is theoretically possible to acquire a transfer rate which is four times that of a single antenna system. Since the theoretical increase in the capacity of the multiple antenna system was proved in the mid-1990s, various technologies to substantially improve a data transfer rate have been actively developed up to now, and some of theses technologies are already applied to various wireless communications standards such as the third-generation mobile communications and the next-generation wireless local area network (LAN).

The multiple antenna technology can be divided into spatial diversity and spatial multiplexing. Spatial diversity is a scheme that increases transmission reliability using data symbols transmitted through various channel paths, and the spatial multiplexing is a scheme that enhances the transfer rate by simultaneously transmitting multiple data symbols using multiple transmit antennas. In addition, when these two schemes are properly combined, advantages of both schemes may be properly obtained.

Recently, such multiple antenna technology has also been applied to terminals. Depending on mobility, terminals can be divided into mobile/portable terminals and stationary terminals. The mobile terminals can be sub-divided into handheld terminals and vehicle mounted terminals depending upon whether or not the terminals can be directly carried around by the user.

As the terminals are diversified, some of the terminals are implemented as multimedia players having such functions as capture of images or video, reproduction of music or video files, execution of games, and reception of broadcast signals. In addition, some terminals support connection to a vehicle, thereby providing a more convenient environment for voice calls when connected to the speaker or microphone of the vehicle over a short-range communication network. Meanwhile, a technology to enable reproduction of multimedia files of a terminal through an audio/video system of the vehicle is also commercialized.

In view of communication performance, however, a terminal mounted in a vehicle may undergo a problem of signal attenuation (in-car penetration loss) by about −20 dB when a signal reaches the terminal through the glass or metal sheet of the vehicle. This phenomenon may increase power consumption in the terminal and deteriorate quality of service. Moreover, in the case of a mobile terminal, due to size constraints, positioning of antennas to achieve diversity may be limited in implementing the multiple antenna technology.

DISCLOSURE

Technical Problem

The present invention is directed to providing an improved communication environment in a vehicle.

Particularly, an object of the present invention devised to solve the problem lies in a method for efficiently performing wireless communications with the multiple antenna technique using resources of a vehicle and an apparatus for executing the same.

The present invention is not limited to the aforementioned objects. Other objects of the present invention not mentioned above will be clearly understood by those skilled in the art from the following description.

Technical Solution

The object of the present invention can be achieved by providing a data transceiving method for a terminal using a vehicle mounted-type communication module including a plurality of antennas including establishing a wired data path with the communication module, negotiating multiple-antenna capabilities with a base station using multiple-antenna capabilities information of the communication module, and transmitting, to the communication module, a data unit comprising uplink data to be transmitted to the base station and multiple-antenna transmission parameters based on the negotiation, wherein the data unit may be created in a medium access control (MAC) layer of the terminal, converted into a radio frequency (RF) signal in a physical (PHY) layer of the communication module, and transmitted to the base station over the antenna.

In another aspect of the present invention, provided herein is a data transceiving method for a vehicle mounted-type communication module including a plurality of antennas including establishing a wired data path with a terminal, transmitting multiple-antenna capabilities information of the communication module to the terminal, receiving, from the terminal, multiple-antenna transmission parameters negotiated with the base station, receiving, from the base station, a data unit including uplink data to be transmitted to the base station, converting the data unit into a radio frequency (RF) signal based on the negotiated multiple-antenna transmission parameters, and transmitting the RF signal to the base station using the antennas.

In another aspect of the present invention, provided herein is a data transceiving method for a terminal using a vehicle mounted-type communication module including a plurality of antennas including establishing a wired data path between the terminal and communication module, the terminal negotiating multiple-antenna capabilities with a base station using multiple-antenna capabilities information of the communication module, the terminal transmitting, to the communication module, multiple-antenna transmission parameters based on the negotiation, the terminal transmitting, to the communication module, a data unit including uplink data to be transmitted to the base station, the communication module converting the data unit into a radio frequency (RF) signal, and the communication module transmitting the converted RF signal to the base station over the antennas, wherein the data unit may be created in a medium access control (MAC) layer of the terminal and converted into the RF signal in a physical (PHY) layer of the communication module.

Advantageous Effects

According to the present invention, more efficient MIMO communication may be implemented using a plurality of antennas provided to a vehicle.

In addition, since physical layer computation and transmission/reception of a radio signal are executed using resources of a vehicle, power of a terminal may be saved.

It will be appreciated by those skilled in the art that effects that can be achieved with the present invention are not limited to those described above and other effects of the present invention will be more clearly understood from the following description.

BEST MODE

Figure 1:
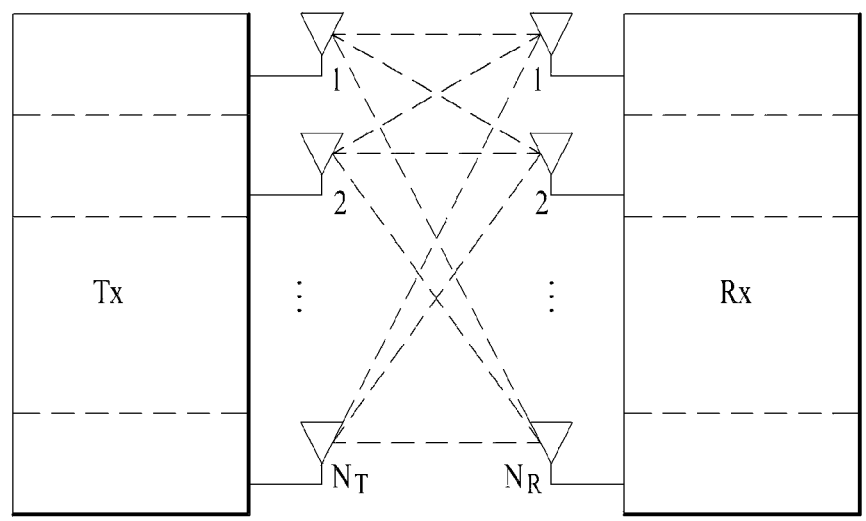
FIG. 1 is a view illustrating the configuration of a typical multiple antenna (MIMO) communication system.

The present invention relates to a wireless access system. Embodiments of the present invention given below will disclose a method for efficiently performing MIMO communication using resources of a vehicle and an apparatus to execute the same.

Embodiments described below are combinations of elements and features of the present invention. The elements or features may be considered selective unless mentioned otherwise. Each element or feature may be practiced without being combined with other elements or features. Further, an embodiment of the present invention may be constructed by combining some of the elements and/or features. The order of operations described in embodiments of the present invention may be changed. Parts of the constituents and features of an embodiment may be included in another embodiment and may be replaced with equivalent constituents and features in another embodiment.

In describing the embodiments of the present invention, a relationship between a base station and a terminal in data transmission and reception will be focused upon. Herein, the base station serves as a terminal node of a network that communicates directly with the terminal. In some cases, a specific operation described as performed by the base station may be performed by an upper node of the base station.

Namely, it is apparent that, in a network comprised of a plurality of network nodes including a base station, various operations performed for communication with a terminal may be performed by the base station, or network nodes other than the base station. The term 'base station (BS)' may be replaced with the term 'fixed station', 'Node B', 'eNode B (eNB)', 'Access Point (AP)', or 'Advanced BS (ABS)'. The term 'terminal' may be replaced with the term 'User Equipment (UE)', 'Mobile Station (MS)', 'Mobile Subscriber Station (MSS)', 'Advanced MS (AMS)', or 'Subscriber Station (SS)'.

The embodiments of the present invention may be implemented by various means, for example, hardware, firmware, software, or a combination thereof.

In a hardware configuration, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods of the embodiments of the present invention may be implemented in the form of a module, a procedure, or a function that performs functions or operations described above. Software code may be stored in a memory unit and executed by a processor. The memory unit is located at the interior or exterior of the processor and may transmit and receive data to and from the processor via various known means.

The embodiments of the present invention can be supported by standards documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts which are omitted for clear illustration of the technical features of the present invention can be supported by these documents. Further, all terms as set forth herein can be explained by the standards documents. Particularly, the embodiments of the present invention can be supported by at least one of P802.16-2004, P802.16e-2005, P802.16Rev2 and IEEE P802.16m, which are standards for IEEE 802.16 systems, and Technical Specification (TS) for 3rd Generation Partnership Project (3GPP) systems.

Specific terms used in the following descriptions are provided to aid in understanding of the present invention. The terms may be replaced with other terms within the scope and spirit of the present invention.

Multiple Antenna Technology Using Resources of a Vehicle

According to one embodiment of the present invention, a method for providing an improved communication environment for a terminal and a vehicle using resources of the vehicle and an apparatus to implement the same are provided.

Figure 2:
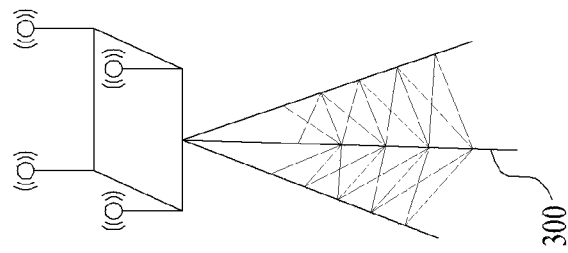
FIG. 2 is a conceptual diagram illustrating an example of communication among a terminal, a vehicle, and a base station.
Figure 2:
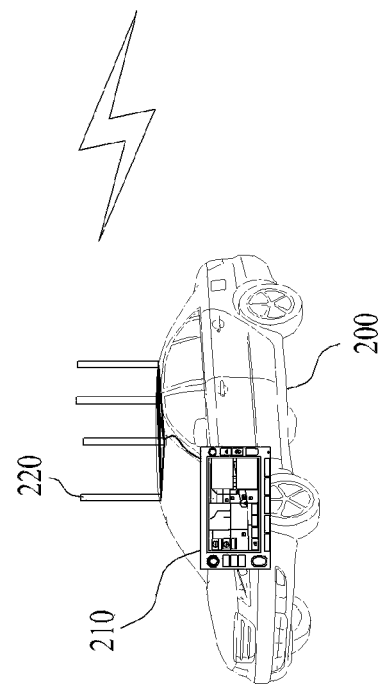
Figure 2:
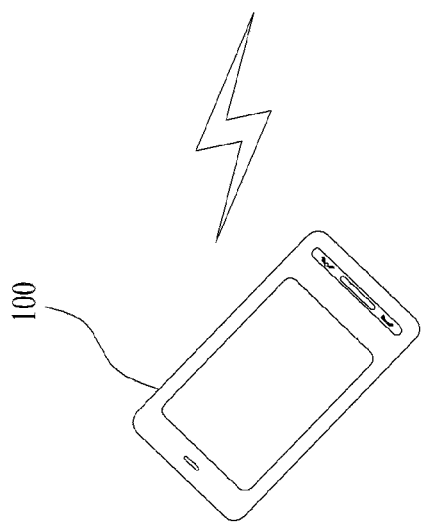

FIG. 2 is a conceptual diagram illustrating an example of communication among a terminal, a vehicle, and a base station.

Referring to FIG. 2, a terminal 100 generally performs wireless communication directly with a BS 300 using the multiple antenna technology. In the case that the vehicle 200 is provided with a communication support module 210 and a multiple-antenna module 220, which are required for wireless communication, the terminal 100 may be assisted by the computational unit 210 and the multiple-antenna module 220 of the vehicle.

Herein, the communication support module 210 of the vehicle 200 may be included in an electronic control unit (ECU), which functions to control overall functions of the vehicle, or may be provided separately from the ECU.

Preferably, the communication support module 210 supports protocol identical to the protocol that the terminal complies with in communicating with the BS or more various kinds of protocol (i.e., the multimode). In view of a protocol layer model, it is preferable that the communication support module 210 at least includes a physical (PHY) layer. The communication support module 210 may further include a media access control (MAC) layer to perform an extended function.

In addition to the functions require for wireless communication, the communication support module 210 may support a wired/wireless interface for connection to the terminal. In the case of the wired interface, a USB type connection or a cable having specifications newly defined for a function may be employed. In the case of the wireless interface, a radio protocol (e.g., WI-Fi, Bluetooth, ZigBee, IrDA, NFC, etc.) for short-range communication may be used. Accordingly, in the case of wireless connection, the terminal and the communication support module may be provided with a modem to communicate with the BS for interconnection and a separate modem which may be simultaneously used along with the modem for interconnection (namely, the terminal and the communication support module may operate in a multi-mode).

The terminal 100 and the communication support module 210 may establish a data path by performing, through the interface, an initial access procedure which is pre-defined therebetween. The initial access procedure may include security/authentication procedures.

Additionally, the wired/wireless interface may include a charging function. The wired charging may be implemented in a manner identical or similar to USB charging. For the wireless charging, wireless induction charging may be used.

The multiple-antenna module 220 may be arranged to be exposed to the exterior of the vehicle 200 as shown in FIG. 2, or may be installed inside the vehicle 200. Preferably, the multiple-antenna module 220 is provided with antennas, the number of which is equal to or greater than the number of antennas of the terminal.

Meanwhile, for convenience of description, both the communication support module 210 and the multiple-antenna module 220 will be referred to as an advanced in-vehicle mobile system (AIMS) in this specification.

Wired Connection Between the Terminal and the AIMS

Hereinafter, a description will be given assuming the case of wired connection between the terminal 100 and the AIMS according to this embodiment.

In the case of the wired connection, this embodiment proposes that the terminal forward a raw data unit produced in the MAC layer (e.g., MAC PDU or PHY SDU) directly to the communication support module 210, not through the PHY layer of the terminal and that the PHY layer procedures be performed in the communication support module. To this end, it is proposed that a service access point (SAP) be established at the boundary between the MAC layer of the terminal and the PHY layer of the communication support module. That is, in uplink transmission, the MAC PDU (PHY SDU) may be transferred from the terminal to the PHY layer of the communication support module through the access point, and then transmitted to the BS after undergoing PHY layer processing. On the other hand, in downlink reception, a PHY signal is received from the BS and the PHY layer processing of the signal is performed in the PHY layer of the communication support module. Then, the resultant PHY SDU (MAC PDU) may be transferred to the MAC layer of the terminal through the access point.

This will be described with reference to FIG. 3.

Figure 3:
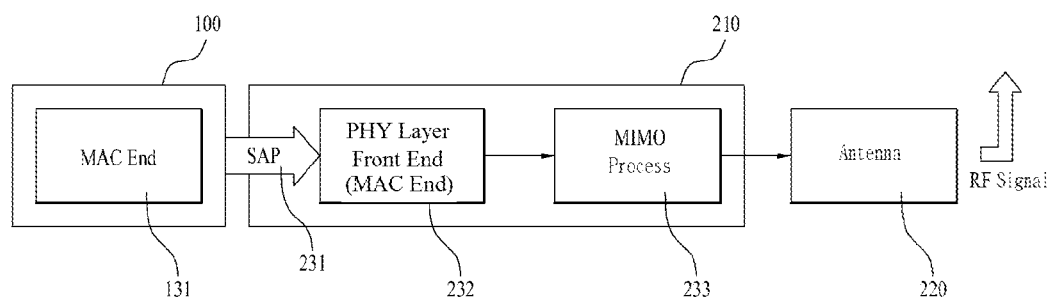
FIG. 3 is a view illustrating an example of a layer-specific data transmission process in the case of wired connection between a vehicle and a terminal according to one embodiment of the present invention.

FIG. 3 is a view illustrating an example of a layer-specific data transmission process in the case of wired connection between a vehicle and a terminal according to one embodiment of the present invention.

FIG. 3 shows only the process of the uplink transmission. In the process of downlink reception, which is obtained when the above process is reversed, a description of the same parts will be omitted for simple and clear illustration.

Referring to FIG. 3, the MAC PDU (PHY SDU) created in the MAC layer 131 of the terminal 100 is transferred to the PHY layer of the communication support module 210 via the SAP 231. As the MAC PDU (PHY SDU) passes through the PHY layer front end 232 of the communication support module and the MIMO processing 233, a radio frequency (RF) signal) may be created at the PHY layer distal end and transmitted to the BS through the multiple-antenna module 220. Herein, typical PHY processing may be performed at the PHY layer front end 232 as the preparation step for the MIMO processing 233. The MIMO processing 233 may include processes such as precoding and codeword-to-layer mapping for execution of MIMO. These processes are exemplary, and applied processes may be changed depending upon standards of wireless communication protocols used for communication with the BS. Meanwhile, the MIMO processing 233 is preferably implemented not based on the MIMO capabilities of the terminal, but on the MIMO capabilities of the vehicle (e.g., a power amplifier of the vehicle and the number of transmit (Tx)/receive (Rx) antennas of the MIMO module equipped in the vehicle.

Hereinafter, a data exchange procedure to which the aforementioned communication method is applied will be described in more detail with reference to FIG. 4, starting with the connection step.

Figure 4:
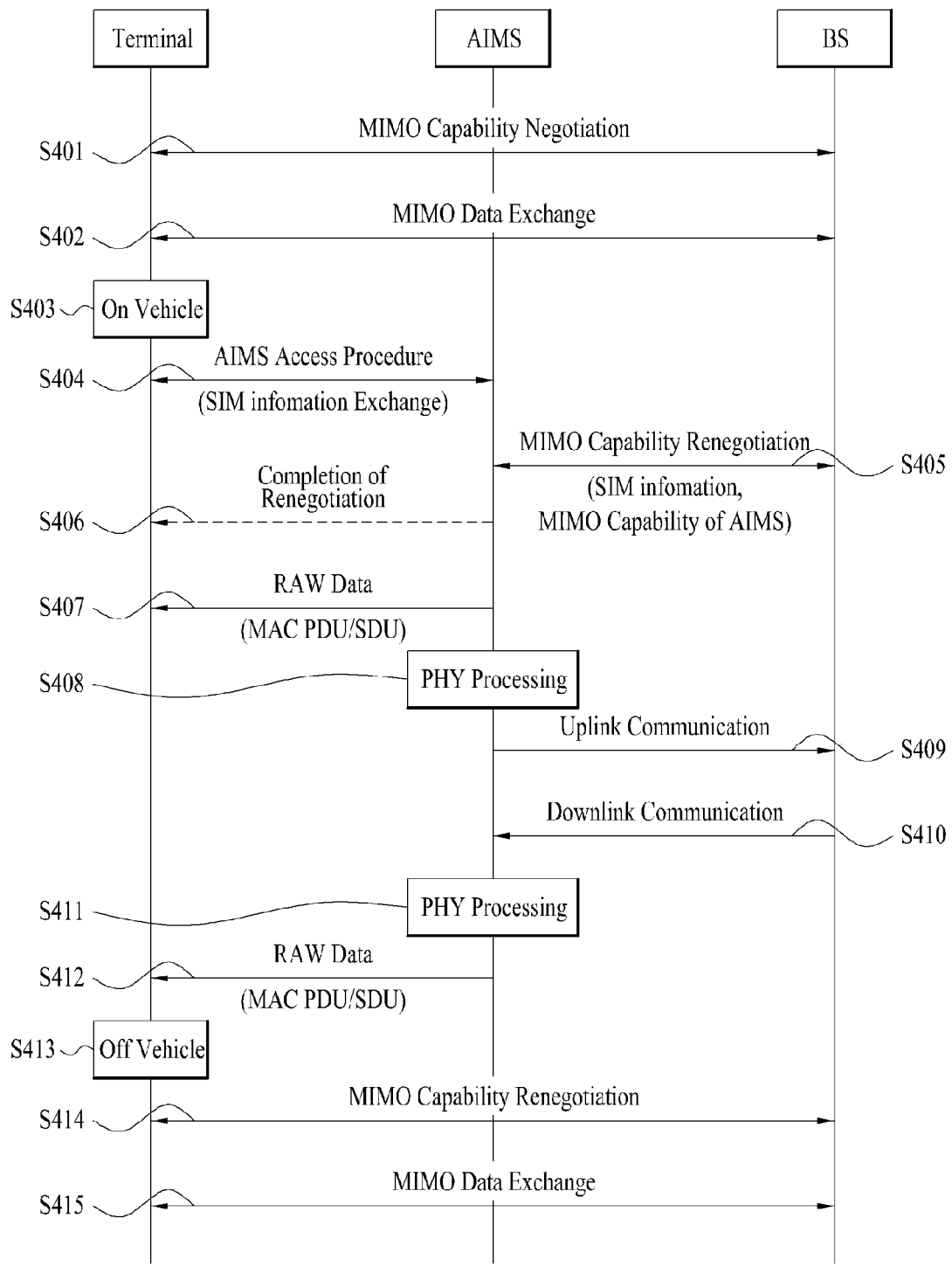
FIG. 4 is a flowchart illustrating an example of data exchange procedure with a base station in the case of wired connection between a vehicle and a terminal according to one embodiment of the present invention.

FIG. 4 is a flowchart illustrating an example of a data exchange procedure with a base station in the case of wired connection between a vehicle and a terminal according to one embodiment of the present invention Referring to FIG. 4, the terminal may negotiate MIMO capabilities with the BS according to the procedure defined in the protocol used in wireless communication (S401), and perform data exchange using the multiple antenna technology by applying the multiple-antenna transmission parameters according to the result of negotiation (S402). At this time, the objects to be negotiated may include the number of Tx/Rx antennas, the power amplifier (PA) class, and the buffer size.

In this situation, the terminal user enters a vehicle provided with a communication support module and a multiple antenna module (AIMS) and performs wired connection between the terminal and the AIMS (S403). Herein, wired connection means connection via a cable or mounting to a mount provided with a connector.

According to the wired connection, an initial access procedure is performed between the terminal and the AIMS (S404). In the initial access procedure, exchange of identification information between the terminal and the AIMS, security/authentication procedure, and exchange of context information between the terminal and the BS may be performed. Herein, the identification information of the terminal may include AMSID and subscriber identification module information.

When the initial access procedure is completed, the AIMS may renegotiate the MIMO capabilities with the BS using the acquired identification information of the terminal (S405). At this time, renegotiation of the MIMO capabilities may be performed through a message newly defined for this function. In the negotiation process, MIMO capabilities (the number of Tx/Rx antennas, the power amplifier class, the buffer size, etc.) of AIMS rather than the MIMO capabilities of the terminal may be transferred to the BS. The renegotiation may be performed such that each parameter is updated using a MIMO capability renegotiation message defined in conventional communication protocols.

In an example of the negotiation procedure, when a negotiation request message containing the MIMO capabilities information of the AIMS is transmitted to the BS, the BS may determine MIMO parameters to be applied to MIMO communication through the AIMS and transmit the same to the AIMS through a negotiation response message.

When the negotiation is successfully completed, the AIMS may selectively transmit information indicating completion of the negotiation to the terminal (S406).

As the negotiation with the BS completed, raw data (i.e., the MAC PDU) to be transmitted to the BS is transferred from the terminal to the AIMS in the uplink transmission step (S407). At this time, the raw data may be transferred from the terminal to the AIMS via the SAP established between the MAC layer of the terminal and the PHY layer of the AIMS (S407).

Then, the AIMS may perform PHY layer processing for the raw data (S408), and transmit the data to the BS via the multiple-antenna module (S409). Herein, the PHY layer processing may be performed according to the parameters negotiated in step S405.

In the downlink reception, a downlink RF signal transmitted from the BS may be received through the multiple-antenna module of the AIMS (S410).

The downlink RF signal may be restored to the raw data through the PHY layer processing in the PHY layer of the AIMS (S411), and the restored raw data may in turn be transferred to the terminal via the SAP (S412).

Thereafter, when connection between the terminal and the AIMS is released (S413), the terminal may perform renegotiation with the BS according to the MIMO cap released abilities thereof (S414), and then may directly perform data exchange with the BS (S415).

While the AIMS is illustrated in FIG. 4 as performing the MIMO capability renegotiation with the BS using the identification information of the terminal, the terminal may perform the corresponding step (S405) without operation of the AIMS. That is, in step S404, the terminal may acquire the MIMO capabilities information of the AIMS, and transfer the raw data to the AIMS after informing the AIMS of the result of negotiation upon completion of the negotiation according to the acquired capabilities information of the AIMS. Thereby, the AIMS may perform the PHY processing in accordance with the result of negotiation.

In another method for step S405, the raw data is transferred via the SAP at the same time the terminal is connected to the AIMS. In this process, the PHY processing of the AIMS may be performed according to the MIMO capabilities of the terminal until completion of renegotiation, and after completion of renegotiation, the PHY layer processing may be performed according to the MIMO capabilities of the AIMS. For example, when the terminal creates a MAC PDU containing a MAC management message for renegotiation and transfers the same to the AIMS, the AIMS may perform the PHY layer procedure according to the MIMO capabilities of the terminal until completion of renegotiation and transfer a corresponding message to the BS. After completion of the procedure of negotiation of MIMO capabilities with the BS, the AIMS may perform PHY layer processing according to the negotiated parameters.

As another aspect of this embodiment, the SAP may be established at the PHY layer distal end (i.e., RF signal input/output terminals) of the terminal, rather than between the MAC layer of the terminal and the PHY layer of the AIMS. For example, when it is assumed that the terminal is provided with two antennas and the AIMS is equipped with four antennas, the terminal performs PHY processing for two streams for MIMO transmission, and an RF signal for two antennas is created and output at the PHY layer distal end. The RF signal for two antennas may be transferred to the AIMS via the SAP, and the AIMS may repeatedly transmit one RF signal over every two antennas. In uplink, as the RF signal created in the PHY layer of the terminal is repeatedly transmitted through the multiple-antenna module of the AIMS, a selection gain or a beamforming gain may be obtained, thereby enhancing the performance. On the other hand, in downlink, an RF combination gain may be obtained by combining the reception signals of the receive antennas provided to the multiple-antenna module.

As another aspect of this embodiment, upon initial access to the AIMS, the terminal may acquire the MIMO capabilities of the AIMS, perform MIMO capability renegotiation with the BS based on the MIMO capabilities information of the AIMS, and then perform the PHY layer processing according to the result of negotiation. Thereafter, the RF signal may be transmitted to the BS over the multiple antennas of the AIMS via the SAP established at the PHY layer distal end. For example, when it is assumed that the terminal is provided with two antennas and the AIMS is equipped with four antennas, the terminal performs the PHY processing for two streams for MIMO transmission (i.e., two code words are mapped to two layers) in normal cases. However, in the case that the terminal performs renegotiation of use of four antennas with the BS, the terminal may perform the PHY processing with four streams for the data to be transmitted on uplink, regardless of the number of antennas of the terminal. That is, the terminal assumes four virtual antennas and performs PHY processing. The RF signals for the four streams created/output at the PHY layer distal end of the terminal may be transferred to the AIMS via the SAP, and the AIMS may allocate different RF signals to the four antennas respectively to perform uplink transmission. That is, in application of this method, two codewords are mapped to four layers, and thus transmission is performed using four antenna ports. Even in downlink, when the BS transmits RF signals in four streams, the multiple antennas of the AIMS may receive the respective signals and transfer the same to the PHY layer of the terminal via the SAP. In the PHY layer of the terminal, the PHY processing may be performed for the four streams of the transferred signals to create a downlink MAC PDU.

Wireless Connection Between the Terminal and the Communication Support Module

Hereinafter, a description will be given, assuming wireless connection between the terminal 100 and the AIMS according to one embodiment of the present invention.

In the case of the wireless connection according to this embodiment, communication based on virtual subscriber identification module (SIM) information is proposed.

In this method, when the user carrying the terminal enters a vehicle (i.e., when the terminal is within the coverage of the short-range communication network of the AIMS provided to the vehicle), a predetermined procedure of initial connection between the terminal and the AIMS may be performed, and then the SIM information of the terminal for cellular communication may be transferred to the AIMS. Thereafter, the terminal may transfer information to be transferred to the BS to the AIMS through the short-range communication, and the AIMS may perform cellular communication with the BS using the SIM information of the terminal.

At this time, renegotiation of MIMO capabilities may be performed between the AIMS and the BS to ensure more efficient MIMO communication. In this case, the BS may recognize that only the MIMO capabilities of the terminal of the same user (on the basis of the same SIM information) have changed. Parameters and types contained in the capability renegotiation message are similar to those for the wired connection, and thus a description thereof will be omitted.

Structures of the Terminal, the Communication Support Module and the BS

Hereinafter, a description will be given of a terminal, a communication support module and a BS which can implement the above examples according to another embodiment.

The terminal and the communication support module may operate as a transmitter in the uplink and as a receiver in the downlink. The BS may operate as a receiver in uplink and a transmitter in downlink. That is, the terminal and the BS may include a transmitter and a receiver for transmission of information or data.

The transmitter and receiver may include a processor, a module, a part, and/or a means to implement embodiments of the present invention. Particularly, the transmitter and the receiver may include a module (means) to encrypt a message, a module to decipher the encrypted message, and an antenna to transceive the message. An example of the transmitter and the receiver will be described with reference to FIG. 5.

Figure 5:
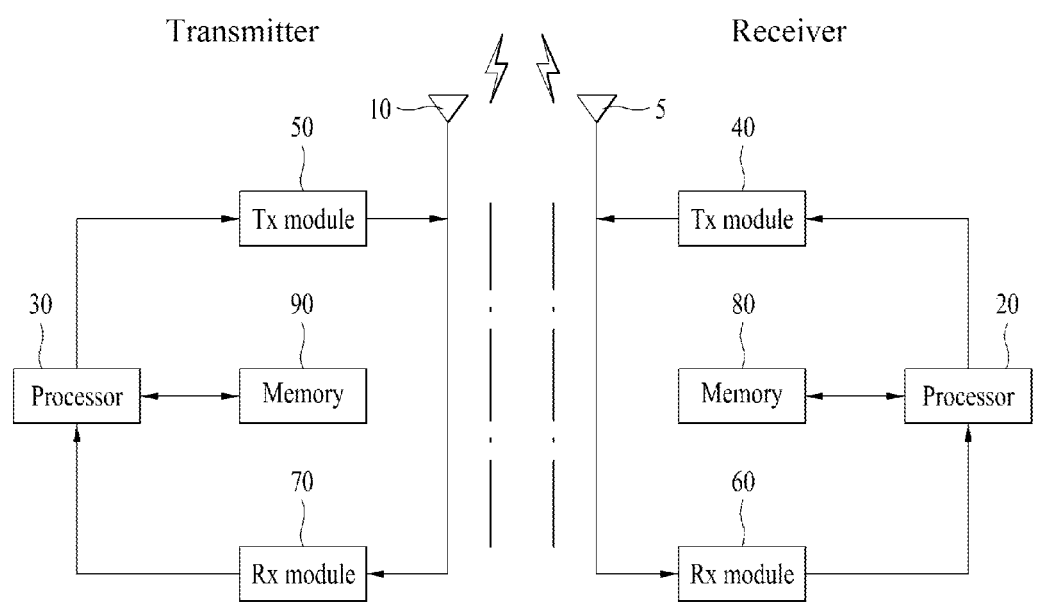
FIG. 5 is a block diagram illustrating an example of the structures of the transmitter and receiver according to another embodiment of the present invention.

FIG. 5 is a block diagram illustrating an example of the structures of the transmitter and receiver according to another embodiment of the present invention In FIG. 5, the structure of the transmitter is shown on the left side and the structure of the receiver is shown on the right side. Each of the transmitter and the receiver may include an antenna 5, 10, a processor 20, 30, a Tx module 40, 50, a Rx module 60, 70, and a memory 80, 90. Constituents corresponding to each other may perform functions corresponding to each other. Hereinafter, each of the constituents will be described in detail.

The antennas 5 and 10 function to transmit a signal created in the Tx modules 40 and 50 to external parts, or to receive an RF signal and transmit the same to the Rx modules 60 and 70. In the case that the MIMO function is supported, two or more antennas may be provided.

The antennas, Tx module, and Rx module may together configure an RF module.

The processors 20 and 30 usually control overall operations of a mobile terminal. For example, the processors may perform a controller function for implementation of the above-described exemplary embodiments of the present invention, a variable medium access control (MAC) frame control function based on service characteristics and an RF environment, a Hand Over function, an authentication and encryption function, etc.

The Tx modules 40 and 50 may encode and modulate data to be scheduled by the processors 20 and 30 and transmitted to the external parts and then transfer the modulated data to the antenna 10.

The Rx modules 60 and 70 may recover original data by decoding and demodulating the RF signal received through the antennas 5 and 10 and transfer the recovered data to the processors 20 and 30.

The memories 80 and 90 may store programs for processing and control of the processors 20 and 30 and temporarily store input/output data. Each of the memories 80 and 90 may include at least one type of storage media such as a flash memory, a hard disk, a multimedia card micro, a card-type memory (e.g., a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, etc.

In the meantime, the BS and the repeater may perform a controller function for implementation of the above-described exemplary embodiments of the present invention, Orthogonal Frequency Division Multiple Access (OFDMA) packet scheduling, Time Division Duplex (TDD) packet scheduling and channel multiplexing, a variable MAC frame control function based on service characteristics and an RF environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means to perform these functions.

In the present invention, it has been assumed that the AIMS is mounted to a vehicle. The vehicle is not limited to those moving on the land by means of wheels. That is, in addition to the transport means commonly called a car, the AIMS is applicable to ships and aircrafts provided with multiple antenna modules.

It will be apparent to those skilled in the art that various modifications and variations can be made in the present invention without departing from the spirit or scope of the invention. The above exemplary embodiments are therefore to be construed in all aspects as illustrative and not restrictive. The scope of the invention should be determined through reasonable interpretation of the appended claims, and all changes coming within the meaning and equivalency range of the present invention are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Embodiments of the present invention are applicable to a terminal, a vehicle, a base station, or the like for a mobile communication system. Specifically, the embodiments are applicable to a method for performing improved wireless MIMO communication in an environment allowing the terminal to use resources of the vehicle and an apparatus therefor.

The invention claimed is:

1. A data transceiving method for a terminal using a vehicle mounted-type communication module including a plurality of antennas, the method comprising:
    establishing a wired data path with the vehicle mounted-type communication module;
    transmitting, to the vehicle mounted-type communication module, a subscriber identification module (SIM) information;
    receiving, from the vehicle mounted-type communication module, information indicating a completion of a negotiation with a base station using the SIM information and a multiple-antenna capabilities information of the vehicle mounted-type communication module; and
    transmitting, to the vehicle mounted-type communication module, a data unit comprising uplink data to be transmitted to the base station,
    wherein the data unit is generated in a medium access control (MAC) layer of the terminal, converted into a radio frequency (RF) signal in a physical (PHY) layer of the vehicle mounted-type communication module, and transmitted to the base station over the antennas,
    wherein the data unit is transmitted from the terminal to the vehicle mounted-type communication module via a service access point (SAP) between the MAC layer of the terminal and the PHY layer of the vehicle mounted-type communication module, and
    wherein the multiple-antenna capabilities information of the vehicle mounted-type communication module comprises at least two of the followings: the number of the antennas, a power amplifier class, or a buffer size.

2. The data transceiving method according to claim 1, wherein the data unit comprises a MAC protocol data unit (MAC PDU) and a service data unit (SDU).

3. The data transceiving method according to claim 1, further comprising receiving, from the vehicle mounted-type communication module via the SAP, a data unit comprising downlink data transmitted from the base station to the terminal.

4. The data transceiving method according to claim 3, wherein the data unit comprising the downlink data is generated in the PHY layer of the communication module and transmitted to the MAC layer of the terminal.

5. The data transceiving method according to claim 1, wherein the establishing comprises acquiring the multiple-antenna capabilities information of the communication module.

6. A data transceiving method for a vehicle mounted-type communication module including a plurality of antennas comprising:
    establishing a wired data path with a terminal;
    receiving, from the terminal, a subscriber identification module (SIM) information;
    negotiating multiple-antenna transmission parameters with a base station using the SIM information and a multiple-antenna capabilities information of the vehicle mounted-type communication module;
    transmitting, to the terminal, information indicating a completion of a negotiation, when the negotiation is completed;
    receiving, from the terminal, a data unit comprising uplink data to be transmitted to the base station;
    converting the data unit into a radio frequency (RF) signal based on the multiple-antenna transmission parameters negotiated with the base station; and
    transmitting the RF signal to the base station using the antennas,
    wherein the data unit is generated in a medium access control (MAC) layer of the terminal and converted into an RF signal in a physical (PHY) layer of the vehicle mounted-type communication module,
    wherein the data unit is transmitted from the terminal to the vehicle mounted-type communication module via a service access point (SAP) between the MAC layer of the terminal and the PHY layer of the vehicle mounted-type communication module, and
    wherein the multiple-antenna capabilities information of the vehicle mounted-type communication module comprises at least two of the followings: the number of the antennas, a power amplifier class, or a buffer size.

7. The data transceiving method according to claim 6, wherein the data unit comprises a MAC protocol data unit (MAC PDU) and a service data unit (SDU).

8. The data transceiving method according to claim 7, further comprising:
    receiving a downlink RF signal directed from the base station to the terminal;
    converting the downlink RF signal into the data unit in the PHY layer; and
    transmitting the converted data unit to the MAC layer of the terminal via the SAP.

* * * * *